Figure 1:
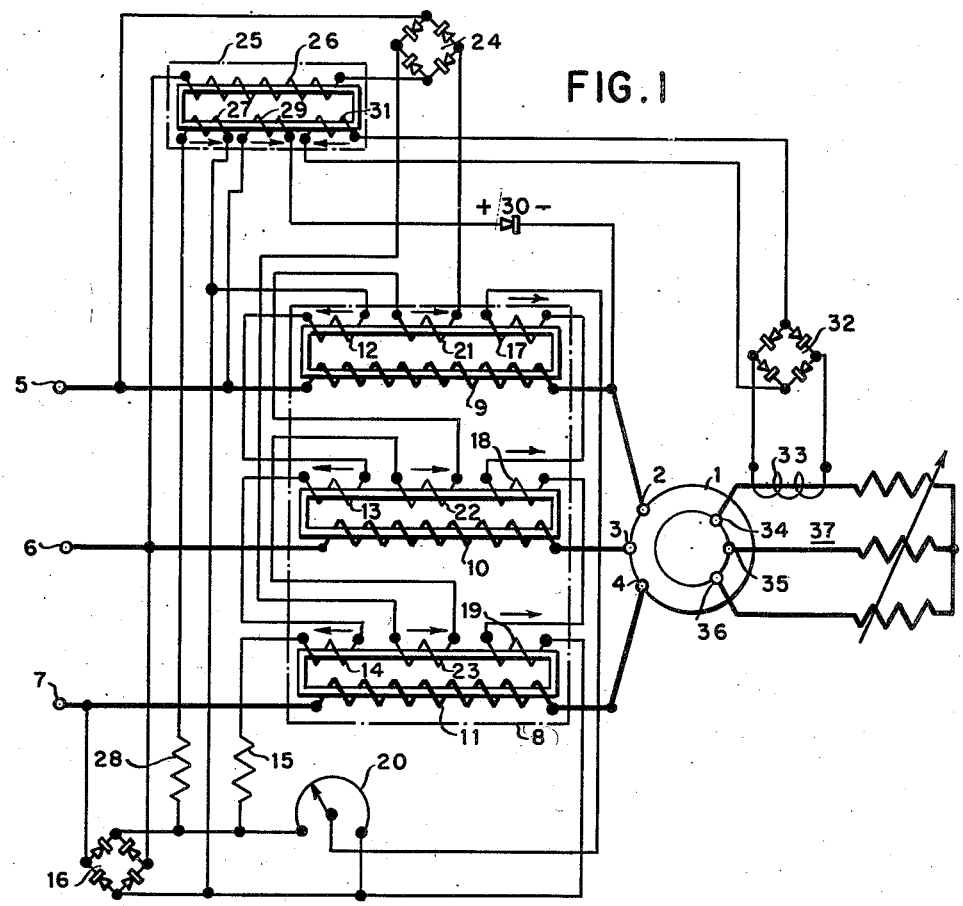

July 2, 1957  H. R. BEHR  2,798,193
SPEED-CONTROL SYSTEMS FOR WOUND ROTOR MOTORS
Filed Oct. 6, 1951  3 Sheets-Sheet 1

INVENTOR.
HERBERT R. BEHR
BY
ATTORNEY

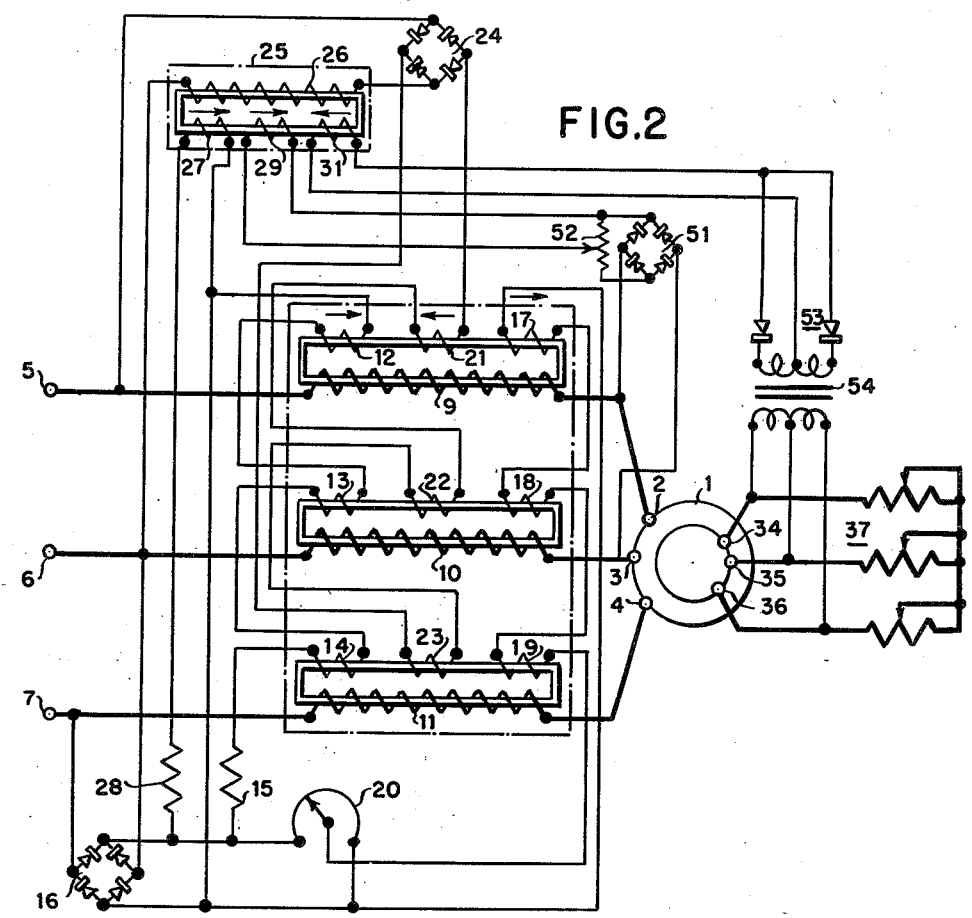
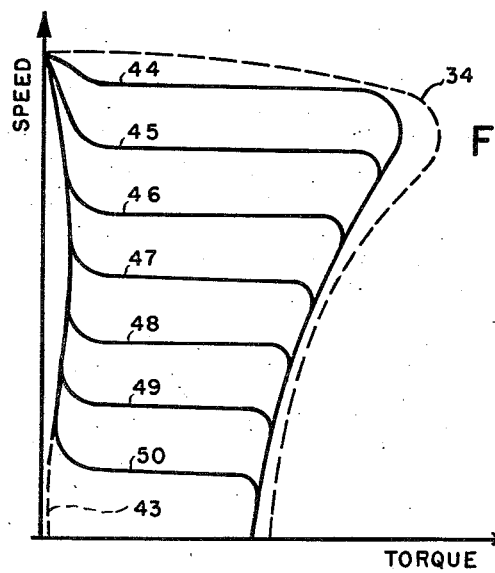

July 2, 1957          H. R. BEHR          2,798,193

SPEED-CONTROL SYSTEMS FOR WOUND ROTOR MOTORS

Filed Oct. 6, 1951          3 Sheets-Sheet 3

INVENTOR.
HERBERT R. BEHR

ATTORNEY

United States Patent Office 2,798,193
Patented July 2, 1957

2,798,193
SPEED-CONTROL SYSTEMS FOR WOUND ROTOR MOTORS

Herbert R. Behr, Western Springs, Ill.

Application October 6, 1951, Serial No. 250,083

2 Claims. (Cl. 318—229)

My invention relates generally to speed control systems for wound-rotor motors and, in one of its particular aspects, to control system for wound-rotor motors in drives for printing presses or the like machinery.

It is an object of my invention to provide a control system capable of operating a wound-rotor motor at a stable and adjustable speed over a wide range of subsynchronous speed values.

It has been thought desirable for some time to replace the direct-current motors, conventionally used in drives for printing presses and the like machinery, by alternating-current induction motors, but so far all attempts have failed to provide a generally acceptable solution. This is due to the fact that induction motors do not lend themselves readily to operating at stable, load-independent speeds other than the synchronous speed, and that the control systems heretofore proposed for securing an adjustable and stable subsynchronous-speed operation have been too complicated, too large, and too unreliable for an economical operation over long periods of continuous performance.

In printing press drives, for instance, it is desired to permit adjusting the normal operating speed over a stepless range of speed values, and it is also necessary to reduce the speed to values below those of normal printing operation for threading or inching purposes. It has been attempted to satisfy these requirements with the aid of induction motors by connecting electronic gaseous discharge tubes in the power circuit of the motor in conjunction with complicated electronic accessories. In these known systems, the regulatory condition-responsive control intelligence is supplied from a tachometer generator through an electronic amplifier whose output is proportional to the motor speed. The intricacy and exacting maintenance requirements of such systems outweigh the advantages expected of the application of induction motors, especially when a wide range of stable drive speeds, as desired in printing press drives, is to be accomplished.

It is therefore a more specific object of my invention to devise an induction motor control system, suitable for printing press drives and similar job requirements, that affords a reliable and stable speed control over a wide and stepless speed range with the aid of control means simpler and smaller than those heretofore needed and of a completely static design so that tachometer machines are not needed for supplying the regulatory control intelligence.

While it is possible and within the scope of my invention to realize the just-mentioned object only for providing speed control and speed adjustment within a desired speed range of normal operation of the drive, using, as customary, a separate drive of much slower output speed of my invention to give the motor control system such a wide range of speed adjustment that one and the same induction motor may be used for operation at normal speeds as well as for slow-speed operation during threading or inching.

In order to achieve these objects, and in accordance with a feature of my invention, I provide the primary energizing circuit of an induction motor of the wound-motor type with voltage control means for varying the primary terminal voltage of the motor, and I control the primary voltage control means by at least two variable intelligence voltages which are responsive to electric conditions of the primary and secondary circuits, respectively, of the wound-rotor motor. One of these variable intelligence voltages is derived from the primary motor circuit and dependent upon the operation of the terminal-voltage control means of the motor, while the other intelligence voltage is derived from the secondary motor circuit and responsive to a current or voltage condition of the motor armature windings. The two intelligence voltages are jointly effective to control the motor terminal voltage, usually in coaction with a normally constant bias or pattern voltage.

According to another, more specific feature of the invention, the alternating-current supply circuit of the wound-rotor motor is equipped with saturable reactor means with one or more direct-current saturation control coils which receive a constant and preferably adjustable excitation from a source of pattern or bias voltage and a variable excitation controlled by at least two direct-current control circuits of variable voltage. One control circuit is electrically connected with the primary motor circuit and responds to an electric condition of that circuit, while the other control circuit is electrically connected to the secondary motor circuit and responsive to an electric condition thereof, the constant or pattern excitation being opposed to the resultant control effect of the variable control excitation.

According to still another feature of the invention, a saturable main reactor, series connected in the primary motor circuit, has aside from its constant-voltage pattern or bias winding means only one control coil for variable control voltage, this single control coil is excited from a rectifier series connected with a saturable transfer reactor which operates as a mixer and has at least two direct-current control circuits electrically connected with the stator circuit and rotor circuit, respectively, to be impressed by the above-mentioned two condition-responsive intelligence voltages.

It will be recognized that, since in motor control systems according to the invention the speed-regulating and stabilizing intelligence voltages are electrically derived from the energy of the motor circuits themselves, these voltages can readily be made available with the aid of completely static and relatively simple circuit devices.

Figure 4:
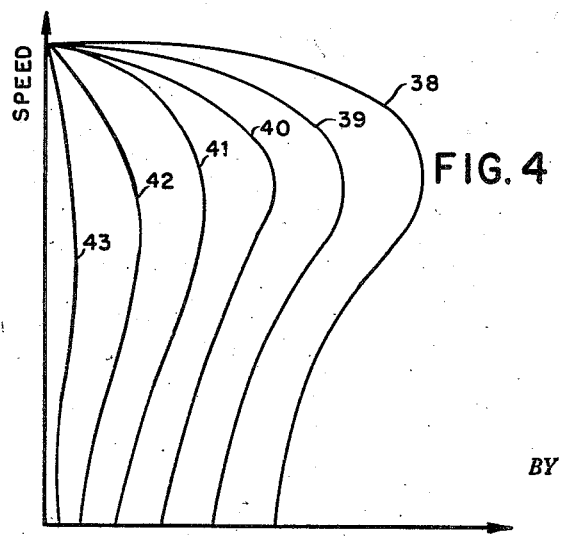
Figure 3:
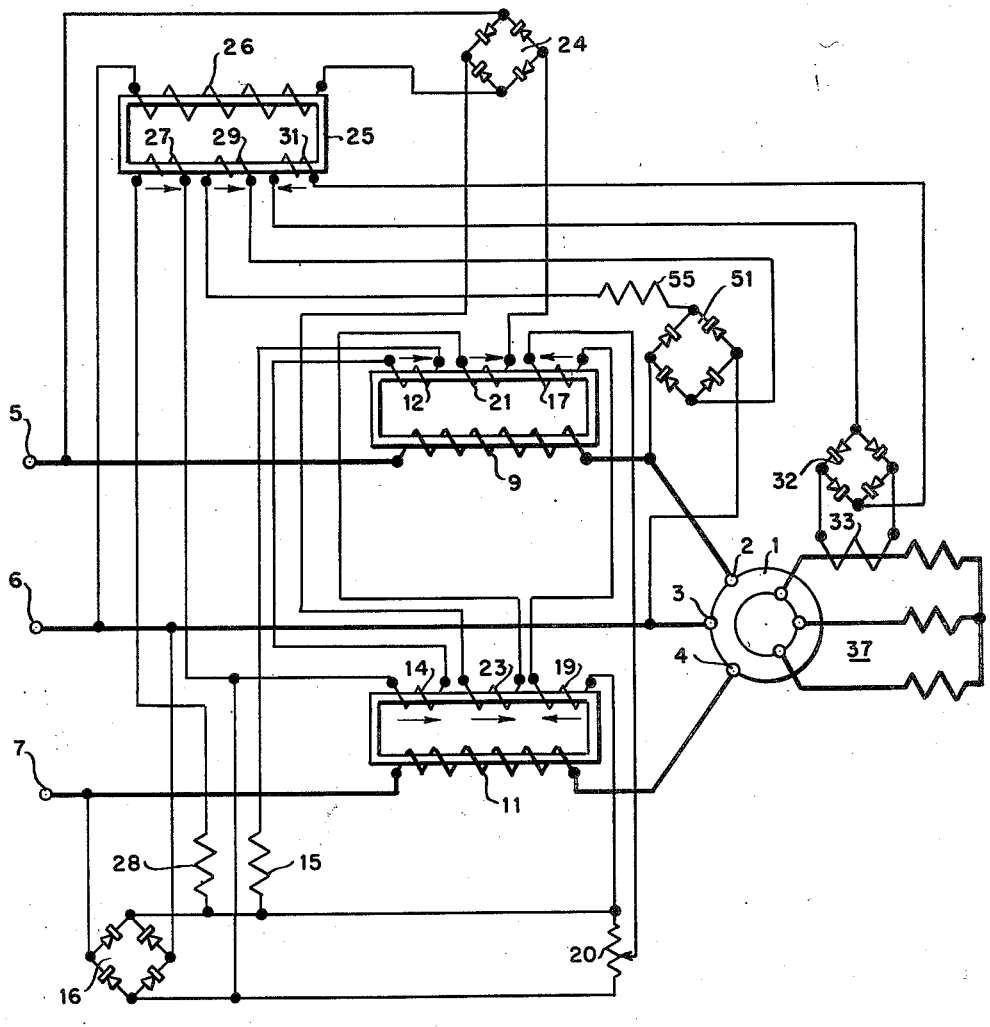

The foregoing and other features of the invention will be apparent, and the above-mentioned performance and advances will be more fully understood from the following description of the embodiments of control systems according to the invention shown by way of example on the drawings in which:

Figs. 1, 2 and 3 show schematically the circuit diagrams of three different systems respectively, while Figs. 4 and 5 are explanatory speed-torque diagrams elucidating the operation of such systems.

In the system of Fig. 1, a wound-rotor induction motor 1 has its field terminals 2, 3, 4 connected with respective line terminals 5, 6, 7. It is inessential and hence not shown whether the motor field windings are star or delta connected. The primary motor circuit between line terminals and motor terminals is equipped with voltage control means consisting of a variable inductance device 8 with three saturable-core reactors, one for each of the three phases of the circuit.

The main inductance winding 9, 10 and 11 of the respective reactors are series connected between motor terminals 2, 3, 4 and respective line terminals 5, 6, 7. The magnetic core means of the device may have any of the various known designs or may be composed of core combinations generally applicable for saturable reactors and providing a closed path for premagnetizing field which is controlled by three sets of premagnetizing control windings 12—13—14, 17—18—19, and 21—22—23. Each of these sets of control windings, as illustrated, comprises three series connected windings, one for each phase, although it should be understood that each set may consist of any single winding or combination of windings, provided the set, when energized, gives identical premagnetizing fields in each of the three phases and prevents or minimizes transformer action between control windings and main inductance windings. The premagnetizing windings 12, 13 and 14 are connected to a direct-current source 16 of constant voltage in order to provide a premagnetizing bias field of constant magnitude.

A calibrating or stabilizing resistor 15 may be series connected with windings 12, 13, 14, if needed. The direct current source 16 is shown as a single-phase full-wave rectifier bridge connected across line terminals 6 and 7, although any other type of direct-current source of steady voltage may be used. The circuit of control windings 17, 18 and 19 is connected to the direct current source 16 through a selectively adjustable potentiometer rheostat 20 which permits setting the premagnetizing current from a very low or zero value up to a magnitude at which the reactor core is saturated. The rheostat 20 of course may be replaced by any other device which, when properly operated, permits adjusting the premagnetizing current in the wanted manner. The control windings 21, 22, 23 are connected to a direct current source 24, here shown as a single-phase full-wave rectifier bridge energized from line terminals 5 and 6, in series with a saturable single-phase transfer reactor 25.

The transfer reactor 25 carries three premagnetizing control coils 27, 29, 31. Coil 27 receives constant bias voltage from the direct-current source 16. A calibrating or stabilizing series resistor 28 may be provided if needed. Coil 29 is connected through a rectifier 30 across the main reactor winding 9 and hence is energized by unidirectional current proportional to the voltage drop of the reactor winding. This voltage drop depends upon the effective reactance of the reactor and varies in inverse proportion to the motor terminal voltage. The valve type rectifier 30 may be replaced by any other suitable rectifier connection such as a bridge rectifier similar to rectifier 16.

The control coil 31 of transfer reactor 25 is connected through a rectifier bridge 32 to a current transformer 33 which is inductively coupled with the secondary circuit of the motor that interconnects the rotor terminals 34, 35, 36 by adjustable resistors collectively designated by 37. The current transformer 33 may be replaced by any other device or circuit giving a direct-current output voltage of a magnitude varying in accordance with the current in the rotor circuit.

In the main reactor 8, the constant bias voltage applied to control windings 12, 13, 14 serves only to determine the operating point or range of the magnetic reactor characteristic, the magnitude and polarity of the bias voltage being dependent upon design and material of the magnetizable reactor core. Under certain conditions the necessity for the bias windings 12, 13, and 14 may be obviated by electrically dimensioning the pattern control circuit of windings 17, 18, 19 so that the latter circuit has also the function of applying the desired constant bias.

It will thus be evident that normally the main reactor 8 is subjected to a component constant premagnetization, furnished by the bias and pattern excitation, whose magnitude is adjusted by means of rheostat 20 in accordance with a desired operating condition, in particular the speed of the motor. This adjusted constant component of premagnetization is opposed by the component of premagnetization controlled by the intelligence excitation applied to windings 21, 22, 23 from rectifier 24 under control by the variable reactance of the transfer reactor winding 26. Consequently, the main reactor, during the operation of the motor, is controlled to adjust the reactance of its main windings 9, 10, 11 and thereby the motor energization so that the adjusted constant pattern excitation is approximately balanced by the variable excitation.

Although this variable excitation is the resultant of a plurality of variable conditions, each of these variables is ultimately dependent upon the load imposed upon the motor. Hence when the motor is operating under steady-state conditions and at the reduced terminal voltage due to the voltage drop of the main reactor winding, the speed torque characteristic of the motor has a shape and a load-responsive behavior determined by the magnitudes and proportions of the condition-responsive intelligence voltages.

Depending upon the desired motor characteristic, the intelligence voltages may be additive or subtractive as regards their respective premagnetization of the transfer reactor, but one of them should be predominant so that the other has substantially a corrective function. As a rule, the motor is predominantly controlled by the intelligence voltage derived from the primary motor circuit, while the voltage derived from the secondary circuit provides a recalibrating or corrective control.

This performance is illustrated by the comparative schematic characteristics shown in Figs. 4 and 5.

If in a wound-rotor motor control system with series impedances, such as the illustrated saturable reactors, the series impedance is of a fixed magnitude, for instance, if in the system of Fig. 1 the premagnetization of the main reactor 8 is kept constant by disconnecting the variable voltage windings 21, 22, 23 or applying constant excitation thereto, then the speed-torque characteristic will have a configuration as typified by the family of curves 38 to 43 shown in Fig. 4, in which A indicates the speed axis and B the torque axis, for a fixed value of resistance in the secondary motor circuit. For the zero value of the series inductance of reactor 8, the system has, for instance, a speed-torque characteristic similar to curve 38 which may be the normal full voltage characteristic of the motor 1.

When the inductance is increased, which is done by decreasing the pattern voltage of rheostat 20 in Fig. 1, the speed torque characteristic changes accordingly so that, for greater and greater values of the inductance, the corresponding speed-torque characteristic will be closer and closer to the speed axis A in Fig. 4. As these characteristics show, some speed control can be obtained by a manually variable series inductance, but such a control permits the motor speed to vary considerably with the motor load. It will now be understood that if the inductance value, besides being manually controlled, is automatically varied in such a way that it decreases for an increase in motor load and increases for a decrease in load, and if this decrease or increase is adjusted properly to the motor and the inductance device, then the speed-torque characteristics of the system can be greatly modified, for instance, to provide a family of curves of the type shown at 44 to 50 in Fig. 5, in which A and B likewise indicate the speed and torque axes, respectively. In the system according to Fig. 1, such an automatic variation is obtained by the automatic control of the current flowing from the rectifier bridge 24 through the reactor control windings 21, 22 and 23, this current being a function of the motor terminal voltage and its secondary or slip-frequency current, both of which are functions of the motor load condition as explained previously.

A considerable advantage of thus modifying and stabilizing the characteristic with the aid of signal voltage directly derived from the secondary motor circuit lies in the fact that these signals have a shorter time constant and are more readily available than signals produced by an added tachometer generator, thus securing a high degree of stability with a very simple circuit design.

The system can be modified by eliminating the transfer reactor 25 and supplying the intelligence voltages directly to one or more premagnetizing windings on the core of the main reactor 8, provided the resulting premagnetizing field in the core of the main reactor is the proper resultant of an adjusted constant voltage and at least two variable control voltages dependent upon a load-determined electric condition of the primary circuit and upon an electric condition of the secondary circuit, respectively.

The motor control systems of Figs. 2 and 3 are to a large extent similar to that of Fig. 1, the same reference numerals being applied to similar respective elements. It will therefore suffice to describe the systems of Figs. 2 and 3 mainly as regards their modified features.

In the system according to Fig. 2, the speed of motor 1 is controlled by regulation of its primary terminal voltage to a value adjusted at a control rheostat 20 in basically the same manner as in the system of Fig. 1. That is, the terminal voltage control is effected by a three-phase main reactance device 9 which, in turn, is saturation controlled by the adjusted voltage from rheostat 20 and a variable voltage impressed upon reactor control windings 21, 22, 23 from a rectifier 24 in series with a transfer reactor 25.

While so far the system is similar to that of Fig. 1, the direct-current control coils 29 and 31 of the transfer reactor 25 in Fig. 2 are differently connected as follows:

Coil 29 is connected to the output terminals of a rectifier 51 whose input circuit is connected across the motor terminals 2 and 3. If necessary, a resistor or rheostat 52 may be inserted between the motor terminals and coil 29 for voltage adjusting or current limiting purposes. The voltage impressed upon coil 29 is proportional to the motor terminal voltage and hence dependent upon the setting of control rheostat 20 and variable in response to changes in motor load.

Coil 31 of transfer reactor 25 is connected through a rectifier circuit 53 and, if necessary, through a transformer 54 across the secondary resistance circuit of the motor and receives a rectified voltage proportional to the slip-frequency voltage which is dependent upon the load and acceleration conditions of the motor. Indeed, by giving the rectifier circuit of coil 31 a capacitive and an inductive saturation component, the voltage value can be made to approach proportionality to the slip frequency to any desired extent. It will be recognized that the voltages of both coils 29 and 31 are ultimately dependent upon the motor load so that, when these voltages or coils are properly poled, the control performance of the system is basically similar to that of Fig. 1 and permits modifying the characteristic of motor operation in the manner typified by Figs. 4 and 5.

A motor control system shown in Fig. 3 is similar to those previously described except that the saturable reactors for controlling the motor terminal voltage are inserted in only two phases of the three-phase primary circuit.

The control windings 12, 17, on the core of reactor main winding 9, and the control windings 14, 19, 23 on the core of reactor main winding 11, 21 are excited in the manner described in connection with the preceding embodiments. Winding 21 receives variable direct current voltage from rectifier 24 under control by the transfer reactor 25. Control coil 29 of the transfer reactor 25 is connected in series with a calibrating resistor 55 to the output terminals of a rectifier 51 which is connected across two motor terminals as in the embodiment of Fig. 2. Coil 31 of the transfer reactor 25 receives voltage from a rectifier 32 whose input circuit is energized from a current transformer 33 in the secondary circuit of the motor as described in conjunction with the embodiment of Fig. 1. In other respects, and as regards the stabilizing and correcting effect of the condition-responsive voltages applied to the transfer reactor, the system operates similarly to the above explained performance of the other embodiments.

While the illustrated embodiments of the invention are equipped with saturable core reactors for controlling terminal voltage and energy supplied to the motor, and although I consider such reactor controls preferably for printing press drives, it will be apparent that other stepless voltage control means such as transformer means can be used for embodying the above-disclosed principles of the invention. Furthermore, while I prefer using in printing press drives a normally adjustable pattern voltage for setting the terminal voltage control means of the motor energizing circuit in accordance with a desired speed or speed-torque characteristic, other known devices for setting such a pattern condition are also applicable. For instance, a constant premagnetization of the saturable reactors can be obtained by means of permanent magnets, or the variable intelligence voltages can be made to furnish an adjustable component of pattern excitation by passing them through a rheostat-adjustable non-linear bridge network of the type known and in use for generator voltage regulators.

It will be obvious to those skilled in the art, upon a study of this disclosure, that such and other modifications are available without departure from the objects and essential features of my invention and within the scope of the claims annexed hereto.

I claim:

1. An alternating-current motor speed control system, comprising a multi-phase wound-rotor motor having a primary circuit and a secondary resistance circuit, saturable main reactor means series connected in a plurality of the phases of said primary circuit and having control means, a pattern circuit of normally constant voltage connected to said control means, a mixer having an alternating-current circuit and having a saturable transfer reactance device and a rectifier series connected in said latter circuit, said rectifier having an output circuit connected with said control means of said main reactance device poled in relation to said pattern circuit to control the speed of said motor, said transfer reactance device having saturation controlling coil means, a first control circuit of variable voltage connected across part of said primary circuit and responsive to a load-dependent voltage of said primary circuit, a second control circuit of variable voltage inputwise connected with said secondary circuit and responsive to an electric condition of said secondary circuit, said first and said second control circuits being both connected with said coil means for jointly controlling said transfer reactance device.

2. An alternating-current motor speed control system, comprising a multi-phase wound-rotor motor having a primary circuit and a secondary resistance circuit, saturable main reactor means series connected in a plurality of the phases of said primary circuit and having control means, a pattern circuit of normally constant voltage connected to said control means, a mixer having an alternating-current circuit and having a saturable transfer reactance device and a rectifier series connected in said latter circuit, said rectifier having an output circuit connected with said control means of said main reactance device poled in relation to said pattern circuit to control the speed of said motor, said transfer reactance device having saturation control coils, a first control circuit connected across part of said primary circuit and having rectifying means connected with one of said control coils to impress on said coil a variable rectified voltage dependent upon a voltage of said primary circuit controlled by said main reactor, a second control circuit having a transformer connected with said secondary circuit and having rectifying means connected with another one of said control coils to impress on said latter coil a variable rectified voltage dependent upon an electric condition of said secondary circuit, whereby said transfer reactance device is jointly controlled by said variable rectified voltages.

References Cited in the file of this patent

UNITED STATES PATENTS

| | | |
|---|---|---|
| 2,408,461 | Wickerham | Oct. 1, 1946 |
| 2,433,153 | Pell et al. | Dec. 23, 1947 |
| 2,455,869 | Krable | Dec. 7, 1948 |